United States Patent [19]

Watts

[11] Patent Number: 5,383,692

[45] Date of Patent: Jan. 24, 1995

[54] THREADED TUBULAR CONNECTION

[76] Inventor: John D. Watts, 5054 Stanhope, Houston, Tex. 77084-3033

[21] Appl. No.: 612,496

[22] Filed: Nov. 14, 1990

Related U.S. Application Data

[63] Continuation-in-part of Ser. No. 315,271, Feb. 24, 1989, Pat. No. 5,018,771, which is a continuation-in-part of Ser. No. 897,069, Jul. 18, 1986, Pat. No. 4,813,717, which is a continuation of Ser. No. 260, Feb. 19, 1985, abandoned, which is a continuation of Ser. No. 1,936, Nov. 23, 1984, abandoned.

[51] Int. Cl.$^6$ .............................................. F16L 33/24
[52] U.S. Cl. .................................. 285/239; 285/333; 285/370; 285/423; 264/145; 264/296
[58] Field of Search ............... 285/423, 355, 390, 919, 285/239; 403/343; 156/173; 264/296, 257, 258, 145, 157, 159, 173

[56] References Cited

U.S. PATENT DOCUMENTS

| | | | |
|---|---|---|---|
| 216,736 | 6/1879 | Hall | 285/239 |
| 1,225,005 | 5/1917 | Boyd et al. | 285/390 X |
| 1,904,675 | 4/1933 | Boyer | 285/390 |
| 2,878,038 | 3/1959 | Nolund | 285/423 X |
| 2,918,314 | 12/1959 | Kemnitz | 285/239 |
| 2,943,967 | 7/1960 | Simon | 285/390 X |
| 3,856,906 | 12/1974 | Edgar | 264/296 X |
| 3,876,234 | 4/1975 | Hurms | 285/423 X |
| 4,154,466 | 5/1979 | Simmons | 285/390 X |
| 4,317,693 | 3/1982 | Reed | 285/423 X |
| 4,404,053 | 9/1983 | Saffire | 156/173 |
| 4,428,602 | 1/1984 | Lambot et al. | 285/423 X |
| 4,943,094 | 7/1990 | Simmons | 285/423 X |
| 5,028,081 | 7/1991 | Fournier | 285/423 X |

Primary Examiner—Dave W. Arola

[57] ABSTRACT

A threaded tubular connection is depicted (120) for connecting joints of reinforced thermosetting resin pipe. Box threads are formed in both ends the joints as at (107) for connection by means of a coupling (102) formed with pin threads (104) on both ends. The coupling is formed of a material having a more reliable compressive strength than the pipe material, to prevent cracking and shattering of the pipe material upon make-up. A process for forming threads with the pipe joints is disclosed.

10 Claims, 2 Drawing Sheets

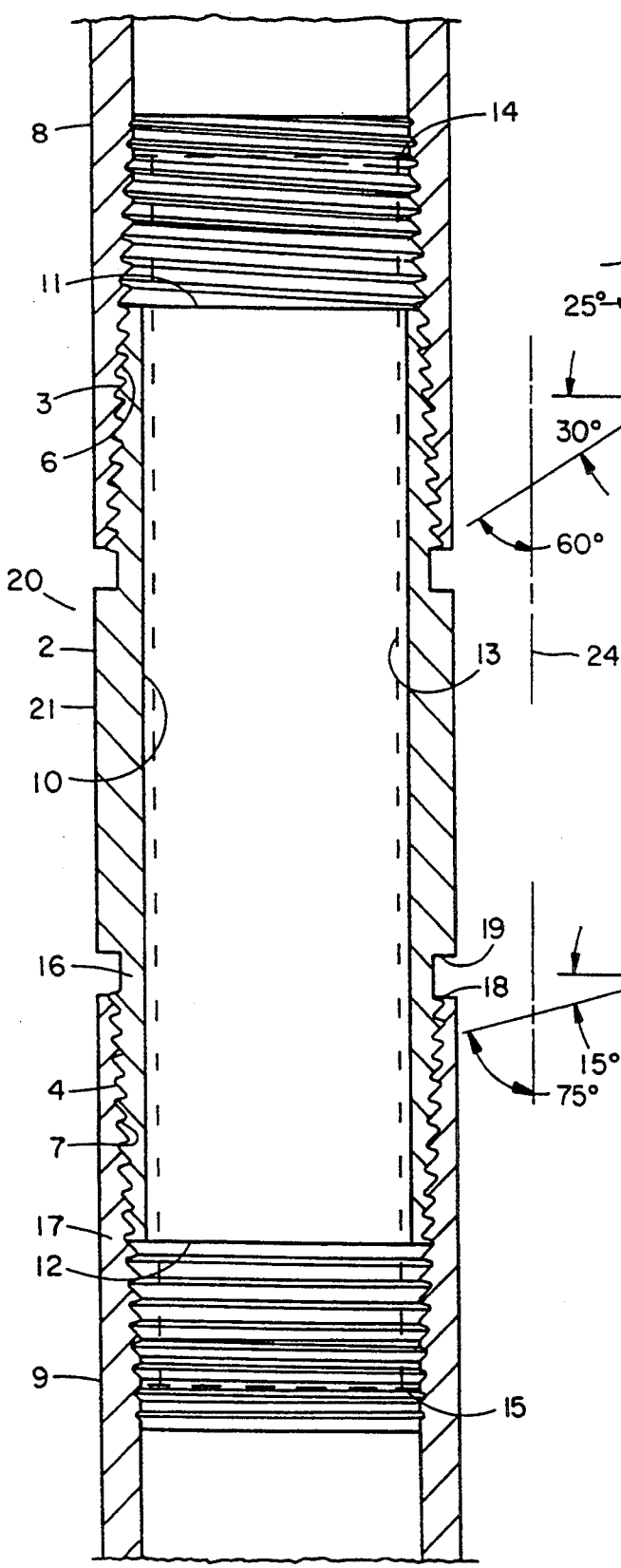
FIG. 1
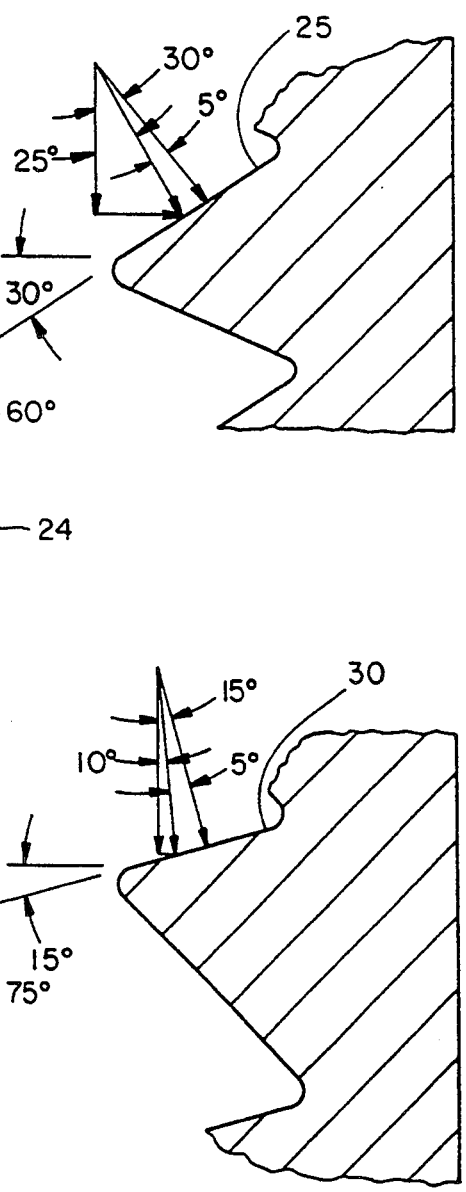
FIG. 3
FIG. 2

THREADED TUBULAR CONNECTION

This application is a continuation in part of prior application Ser. No. 07/315,271 filed Feb. 24, 1989 now U.S. Pat. No. 5,018,771 issued May 28, 1991 which was a continuation in part of Ser. No. 06/897,069 filed Jul. 18, 1986, now U.S. Pat. No. 4,813,717 issued Mar. 21, 1989 which was a continuation of Ser. No. 01/000,260 filed Feb. 19, 1985 now abandoned, which was a continuation of Ser. No. 01/001,936 filed Nov. 23, 1984, now abandoned.

TECHNICAL FIELD

The outer diameters of conventional threaded pipe couplings are substantially greater than the outer diameter of the pipe joints that they connect and the same is true for most strings of casing and tubing installed within oilwells, however, several constraints are presented by oilwells that are not normally present in surface piping systems. Each consecutive string including couplings, must pass within a hole bore diameter established by a drill or by a previously set string of pipe. Additionally, there must be sufficient clearance between that bore and the maximum diameter of the string being run so as to lower freely without sticking and to allow sufficient flow area through the annulus then formed for fluids without causing an unacceptable pressure drop caused by friction of the flowing fluid. Thirdly, oilwell strings must withstand axial tension and compression loads caused by the weight of miles of pipe that may be hanging within the well. Further, oilwell strings may be subject to external fluid pressure being greater than internal pressures to thereby introduce tendency to collapse. For these and other reasons, joints with upset ends and high cost "premium connections" have been introduced to work in the presence of such constraints. However; such solutions result with the outer diameters of connections being greater than the outer diameter of the pipe joints that they connect. There do exist, connections for pipe not having upset ends wherein one end of a joint is threaded externally and the other end is threaded with a mating internal thread such that joints can be screwed together to result in a connection with an outer diameter no larger than the pipe mid-section. However, such joints, such as Hydril FJ Premium tubing connections enjoy only 42% axial tension strength as compared to the unthreaded pipe wall, about the same as non-upset API tubing connections. An oilwell pipe program using API threaded collars must use pipe sizes large enough to radially clear the collar outer diameter of the next string to be run inside of it. It is therefore obvious that all pipes in the program can be smaller if a connection of smaller diameter and sufficient strength can be used for all strings. Many tons of pipe per oilwell may therefore be saved from waste. When a pipe having no reduced wall thickness contains fluid pressure, the axial stress within that wall caused by fluid pressure is approximately one-half of the circumferential stress within that wall caused by the same pressure and therefore a like amount of mechanical axial stress may be applied by pipe weight or the like, without exceeding the circumferential stress. Reduction of the pipe wall thickness as by a thread formed on a joint of non-upset pipe, will therefore reduce still further, the magnitude of axial stress that may be dedicated to support pipe weight. There is therefore a substantial need for a small diameter tubular connection having a higher efficiency with no loss of the connections ability to seal against fluid pressure.

Many wells contain corrosive fluids such as carbon dioxide, hydrogen-sulfide and clorides that can rapidly destroy steel pipe and drastically reduce the economic life of the well and more importantly, cause risk of danger to people and the environment. To solve such a problem, several types of plastic-based pipe materials have been developed and have enjoyed various degrees of success. For service in deep wells, a composite pipe reinforced with glass fibers and held together with thermosetting resin has been the most successful. Such a pipe is defined in API Specification 5AR, entitled "Reinforced Thermosetting Resin Pipe", hereinafter referred to as "RTR" pipe. Although such material is reasonably predictable under tensil stresses, compressive stresses may unexpectedly cause it to crack or to shatter. Pin threads formed on the ends of RTR pipe are placed in severe compression when they are screwed into the mating couplings and because failure during assembly is not uncommon, extreme care is taken to try to reduce such failures. Also, when the pipe is hung into the well, compressive stresses in the pin can increase, to cause failure of the pipe string while in service. Threads specified in API 5AR for RTR pipe are per API 6B, the same 8rd threads specified for steel pipe. To contain a given pressure, RTR pipe of a given size must be thicker than steel pipe of the same size due to a lesser material strength and when combined with a still thicker coupling, the need for a high-efficiency more reliable connection of smaller diameter for use with RTR pipe is even greater than for steel pipe, as discussed above.

BACKGROUND ART

A flush joint tubular connection has inner and outer diameters substantially the same as the tubing joints which the connection connects. A flush joint tubular connection made by the Hydril Co., Inc., and covered by numerous patents comprise a first straight thread, a second straight thread of sufficient diameter to pass within the bore of the first thread and a tapered mating seal between the two joints of tubing which is a premium joint of high cost and according to published data, enjoys only 42% axial strength with regard to the pipe wall.

Standard A.P.I. non-upset tubing connections comprise couplings having outer diameters considerably larger than the pipe outer diameter but still only enjoy approximately 42% efficiency as above. A.P.I. does list a "turned down" collar outer diameter to increase clearance between strings, however, the "turned down" diameter still exceeds substantially, the pipe outer diameter.

No prior art discloses a tubular connection having tapered threads, that when properly assembled, effects optimum stresses within the small end of the external thread and within the large end of the internal thread so as to provide a connection of maximum efficiency. Conventional pipe connections have threads with like tapers and result in a constant diametrical interference along the taper between the external and internal threads, thereby causing excessive stresses or requiring increased wall thickness at the ends of the pipe joint. Excessive stresses reduce the joint strength and an increased wall thickness rules out a minimum diameter connection. It is therefore clear that a high efficiency tubular connection having a minimum diameter as provided by the instant invention is needed for use within oilwells and other pipe assemblies wherein radial clearance is limited.

Ameron Inc., Fiberglass Systems, Inc. and others now make RTR pipe, for use in the presence of corrosive fluids, according to A.P.I. Specification 5AR. The typical process comprises: moulding resin-wetted glass fibers around a cylindrical mandrel in a pattern designed to effect a desired combination of axial and cylindrical strengths; allowing the resin to harden; removing the joint from the mandrel; forming external threads on at least one end thereof in accord with A.P.I. Specification 5CT, the same thread specified for steel pipe. 5AR specifies the maximum diameter for tubing collars in Table 5.3 which are in part: 4.67" for 2.375 pipe; 5.52" for 2.875 pipe; 6.68" for 3.5 pipe; 7.57" for 4.5 pipe. These diameters are proportionally much greater than for like sizes steel pipe couplings: 3.06"; 3.67"; 4.5"; 5.56" respectfully, which together with the thicker pipe wall required, greatly complicates the radial clearance problem discussed above.

In an effort to escape the undesirable compressive characteristics of pin threads formed directly on RTR pipe, "premium connections" have been introduced which comprise; pin threads formed on two short pipes of selected plastic material better able to withstand compressive forces than can RTR material; splicing the short pipes to the ends of the RTR pipe by wrapping resin-wetted glass fibers around the ends of the members to be joined so as to form a pipe joint with pin threads at both ends. When such joints are joined by the use of collars, the compressive forces have been delt with but considerably more labor and material must be used and the new question of splice strength is now present and the large diameter is still a problem as previously discussed.

Pin threads are now formed on RTR pipe by machining or by moulding. Since RTR material is very difficult to machine, machined threads are rough and they have a great tendency to grab and tear out, thereby causing failure. Moulding pin threads on the RTR pipe requires subsequent forming such as the splicing described above or the application of moulds around the ends of the pipe joint after it is formed, which is considerably more complicated and less reliable than the moulding of box threads simultaneously with the forming of the pipe joint.

DISCLOSURE OF INVENTION

The present invention provides a connection for joints of oilwell tubing or the like, having a tubular coupling formed with tapered external threads thereon for mating with tapered internal threads formed within the ends of the tubing joints to be connected.

The coupling may be formed of a material having a higher strength than the material from which the tubing joints are formed so as to allow higher circumferential stresses within the small end of the external threads which is of a thinner wall than the tubing wall thereby adjacent, so as to provide a higher sealing force between the mating threads in the primary seal area. The use of higher strength material for the coupling also provides a higher axial load capacity than would be provided should the external thread be formed on the tubing joint and increases wear life due to the higher hardness.

So as to avoid the pullout tendency inherent in a tubing thread having conventional 60 degree thread flanks with respect to the tubing axis, a thread form is provided that has a load bearing flank angle of 75 degrees or more, the optimum angle depending on such factors as the pipe diameter, the wall thickness and the material strength.

As taught by my series of patents beginning with U.S. Pat. No. 2,766,829 which have enjoyed worldwide commercial success for over thirty years in the oilfield, the space industry and the nuclear industry, the taper of the external thread may be formed at a lesser angle than the taper of the internal thread so as to ensure a maximum primary sealing tendency at the smallest possible pressure area so as to minimize the axial load imposed on the connection due to internal fluid pressure. The present invention may utilize this feature in combination with other features.

Accordingly, initial thread engagement occurs on the external thread at its small diameter end only, simultaneously as a radially spaced relationship exists between the internal and external threads elsewhere. As the connection is tightened toward full makeup, thread contact increases progressively from the small diameter end toward the end of the tubing joint. The threads may be dimensioned such that at full makeup, the threads at the large diameter end are in contact and the circumferential stresses within the tubing joint are less than the circumferential stresses within the small end of the external thread, ideally in proportion to their respective yield strengths.

The use of flank angles that reduce pullout tendency also allows the use of shallower threads such as a thread depth of 0.030" instead of thread depths as used by A.P.I., i.e., 0.0556" for 10 round threads and 0.0712" for 8 round threads for conventional tubing connections. In turn, the shallower thread depth allows for a higher connection efficiency because a smaller portion of the coupling wall is removed to form the thread and thereby, a thinner coupling wall may be used which, in turn, improves radial clearance of the connection and, in turn, makes possible a high efficiency minimum diameter connection.

So as to preclude excessive circumferential stresses of one cooperating threaded member before full makeup of the two, the wall thickness of the two near the small diameter end of the engaged threads may be dimensioned inversely proportional to the strengths of the materials of each.

The coupling may be provided with a shoulder to abut the end of the tubing joint upon full makeup, should conditions require precise makeup lengths, higher torque capacity or greater bending strengths.

Another embodiment of the present invention is as a high efficiency, reliable, minimum diameter connection for RTR pipe. Tapered internal box threads are formed within the ends of each joint of RTR pipe so as to be connected together by a coupling having external threads on both ends, similar to the previously described embodiment. The coupling is formed of a chemically suitable material of sufficient strength for the service intended. Of particular importance is a reliable compressive strength sufficient to withstand compressive forces exerted on the pin threads as the pin is screwed into the box threads so as to eliminate concern that the pin may crack or shatter. Such material may be stainless steel for one service or a homegenous plastic with moulded threads for another service, by way of example. The use of a coupling material that is stronger than the RTR material, affords the advantages as previously described. Because the box threads formed in the pipe joint ends are stressed in tension as they are assembled with the couplings and when suspended into the well, the RTR connection of the present invention is far more reliable than a connection having external threads formed of RTR material, as previously explained. The process to form the joint of RTR pipe of the present invention may comprise: mounting moulds for forming the desired box threads within the ends of the joint, concentrically with a cylindrical mandrel of desired diameter; wrapping a predetermined pattern of resin-wetted reinforcing fibers around the thread moulds and the mandrel so as to effect a predetermined specified length and external configuration of the joint; causing the resin to at least partially harden; removing the moulds and mandrel from the joint so as to provide a RTR pipe joint having internal threads of the desired dimensions and strengths, formed at both ends thereof. The external configuration of the box may be flush with the pipe or it may flare outwardly toward the end of the joint, depending upon the particular service intended. Ideally, the box and the coupling strengths should at least equal the strengths of the RTR pipe body. Thus, it is now apparent that a continuous wrap of the RTR material around the moulds and mandrel can produce a completed, reliable joint of RTR pipe without the need for subsequent operations such as splicing or the application of external thread moulds to the ends, or without cutting fibers by machining.

Pipe sizes that are typically made in great volume may be formed by a process, comprising: wrapping resin soaked reinforcing fibers around a mandrel in a desired pattern and in a continuous length so as to form inner surface 80 with a desired dimension; cutting from the continous length, a joint of predetermined length; applying the thread moulds to the ends of the joint while the resin is sufficiently formable to form the desired internal threads; removing the moulds from the joint after the resin has hardened sufficiently to maintain form of the joint. It is also now apparent that a connection is produced for RTR pipe that is more reliable, smaller in diameter, easier to produce, requires less labor and materials and can better protect the environment.

BRIEF DESCRIPTION OF THE DRAWINGS

FIG. 1 depicts a vertical section of a connector in accord with the present invention.

FIG. 2 illustrates a thread form in accord with the present invention.

FIG. 3 illustrates a thread form in accord with conventional tubing joint threads.

FIG. 6 is a fragmentary section view depicting the forming of a continuous length of pipe.

FIG. 7 is a section view depicting the cutting of a predetermined length joint of pipe from the continuous length.

FIG. 8 is a section view depicting the application of thread moulds to the ends of the joint.

FIG. 9 is a section view depicting a finished joint of pipe after thread moulds have been unscrewed from the joint.

DETAILED DESCRIPTION OF THE INVENTION

Figure 4:
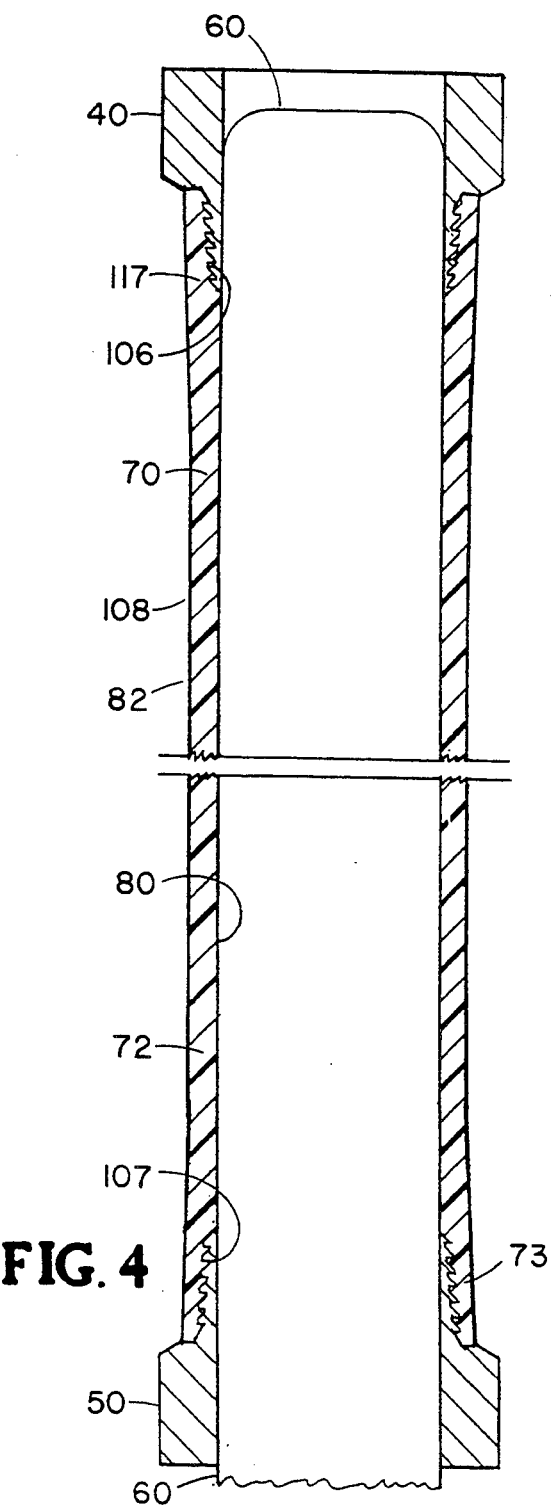
FIG. 4 depicts a vertical section of a joint of tubing in accord with the present invention and production equipment with which it may be formed.

FIG. 1 depicts tubular connection shown generally at 20 comprising coupling 2 with tapered external threads 3 formed on an upper portion and having like threads 4 formed on a lower portion, so as to mate in sealing engagement with tapered internal threads 6 and 7 formed within joints of non-upset tubing 8 and 9 respectively, to be connected. Coupling 2 may comprise inner diameter 10, upper end surface as at 14 and lower end surface as at 15. The coupling thereby extends for substantially the full effective length of the internal threads so as to provide a connection having an axial strength substantially equal to the pipe wall strength to thereby approach 100% efficiency.

Since typical tubing joints have lengths of sixty times or more the lengths of couplings that connect them, the couplings may be formed of material much stronger than the material the joints are formed of without causing significant increase of cost for the entire string. The use of higher strength material for the coupling 2 makes possible a higher axial strength for the connection 20 because the strength of the coupling at neck section 16 is increased and because collapse resistance of the pipe end as at 12 is increased to thereby increase the pullout strength also. To further increase the pullout strength of the connection, a thread form having a load bearing flank formed at 75 degrees with respect to the tubing axis as depicted in FIG. 2, may be used for the mating threads as opposed to the most common thread form used on oilwell tubulars, as depicted in FIG. 3. The thread form of FIG. 3 has a loadbearing flank 25 which effects an angle of 60 degrees with the tubing axis 24. Assuming an angle of friction of 5 degrees, elementary vector analysis will show that the form depicted in FIG. 2 results in a pullout strength of 2½ times that of FIG. 3. Reduction of the flank angle still further, can further eliminate tendency to pull out.

So as to ensure a seal diameter for the connection of least diameter and therefore the least axial fluid load, the taper of the external thread may be made slightly less than the taper of the internal thread. Such a condition also allows maximum radial compression of the coupling as at end surface 12 adjacent pipe joint wall as at 17 which may be formed thicker than the adjacent coupling wall. Thus upon makeup, end 12 will compress more than wall 17 expands due to the difference in thickness. Since coupling 2 may be made of higher strength material than tubing joints 8 or 9, the thickness may be dimensioned such that stresses in walls at 12 and 17 are substantially at the same percentage of the strengths of the materials of which the members are formed.

When the taper of the external thread is made less than the taper of the internal thread, initial contact between the two occurs only at the small end as at 12 with the internal thread as at 17. Upon continued makeup, thread contact progresses toward the larger diameter end of the tapers to cause full engagement of the threads as at 18. A slight amount of further makeup may cause a predetermined magnitude of circumferential stress within the end of the tubing joint as at 18 and thereby establish a position of full makeup, so as to cause: compressive circumferential stresses within end 12 to be at a first desired value simultaneously with tension circumferential stresses within the tubing joint wall between 17 and 18 being at a second desired value, less in magnitude than said first value. Said desired values may be set at the same percentage of the unit yield strengths of the respective materials to thereby effect a maximum strength for the connection.

Connection 20 may comprise shoulder 18 formed on the end of joint 9 and shoulder 19 formed on coupling 2 intermediate thread 4 and the outer diameter 21 of coupling 2. The mating threads may be dimensioned so as to makeup as shown in FIG. 1 or should greater bending strength or greater tortional strength be desired, the mating threads may be dimensioned and given closer tolerances so as to allow shoulders 18 and 19 to abut upon makeup.

Figure 5:
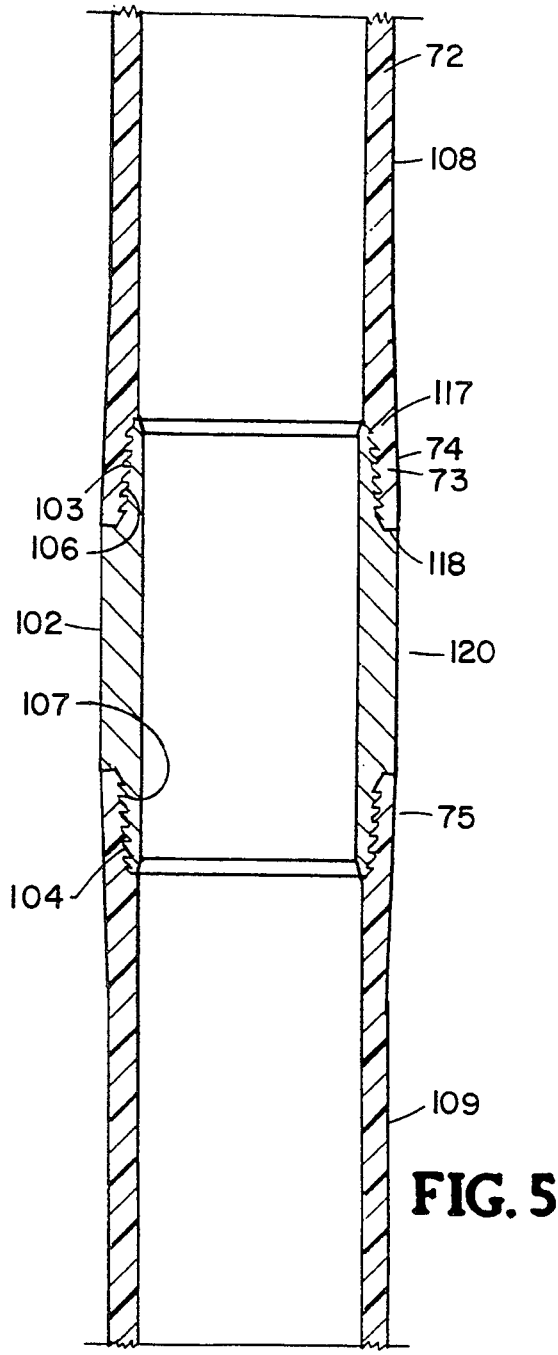
FIG. 5 is an assembly of a connection in accord with the present invention.

An embodiment of the present invention for use as a connection for RTR pipe joints as shown in FIG. 5, comprises pipe joints 108 and 109 which are joined together by coupling 102, numbers above 100 depicting features similar to previously defined features 100 less in number. Such joints may be formed as depicted in FIG. 4 wherein joint 108 has been formed by a process comprising: mounting molds 40 and 50 for forming desired internal threads 106 and 107 respectfully, with cylindrical mandrel 60 of desired diameter; wrapping resin-soaked reinforcement fiber 70 around the assembled moulds and mandrel in a preferred pattern, sufficiently to effect a predetermined desired external configuration for the pipe joint; causing the resin to at least partially harden; removing the moulds and mandrel from the joint so as to form the desired joint of RTR pipe, having box threads at both ends thereof, that are formed so as to be connected by coupling 102. It is now obvious that a continuous wrapping operation may be employed to completely form the joint from end to end. So as to facilitate removal of the mandrel and moulds from the joint of pipe after the resin has hardened sufficiently to maintain the form of the joint, the mandrel may be made: expandable to a diameter as required to form the internal surface 80 of the joint; retractable to a smaller diameter sufficiently so as to remove the mandrel from the joint and from the moulds. The mandrel may comprise a reselient tube that is mounted so as to be exapandable by inflation with air pressure and retracted by decrease of that air pressure. Moulds 40 and 50 may be dimensioned so as to form flush joint connection 20 as depicted in FIG. 1 or to form bell shaped ends 73 and 75 as depicted in FIG. 5 depending upon the strengths and radial clearances required of the connection. When forming large diameter pipe, box wall section as at 74, will be made substantially the same thickness as the nominal pipe wall 72 with the same number of wraps, because the percent change in diameter is small. When using the same number of wraps to form the pipe as the box on small diameter pipe, the thickness of the box wall 74 may decrease substantially from section 117 toward the end 118 of joint 108 as the thread diameter increases. However, since the axial load and the fluid pressure load of the box wall progressively transfer to the pin thread 103 and 104 respectively toward end 118, such a reduction in thickness of box wall 74 may be acceptable. Should a still thinner box wall be desired, then a decreasing number of wraps can be applied from section 117 to end 118. If for some uses, radial clearance is of no concern, then the box wall may be increased if desired, by the application of more wraps than are used to form pipe wall 72.

As previously practiced, the type and pattern of reinforcing fibers can be applied to the joint so as to provide a desired combination of, axial strength for suspending the load and tangential strength for containing the fluid pressure. Also as previously practiced, the fibers and resin used must be suitable for use in the well fluids.

Coupling 102 may be moulded complete, from a chemically suitable plastic material of sufficient strength or it may be machined from plastic, stainless steel or other suitable material.

The reinforcing fiber may be soaked with resin before or after it is wrapped around the mandrel, whichever may be best suitable to form a particular joint of pipe.

Pipe sizes that are typically made in great volume may be formed by a continuous process depicted in FIGS. 6–9 comprising: wrapping resin soaked re-inforcing fibers as at 30 and 32 around mandrel 260 in a desired pattern and in a continuous length as at 33 to form inner surface 280 to desired dimension; cutting by any suitable means as at 36 a joint of pipe 208 from the continuous length to a desired length; applying thread molds 240 and 250 to the ends of the joint while the resin is still formable so as to form desired internal threads 206 and 207 respectfully; removing the molds from the joint per FIG. 9 after the resin has hardened sufficiently to maintain the form of the threads. Rotation of mandrel 260 to facilitate wrapping of fibers 30 and 32 to form continuous pipe 33 is geared to the axial speed 38 such that pipe 33 is formed with the desired wall thickness. Axial speed of devices 34 and 37 are also fixed at speed 38. Device 34 supports pipe 33 to keep it from falling faster than 38. Cutoff device 37 also travels at speed 38 so it will have sufficient time to cut an exact length for joint 208.

I claim:

1. A process for forming a joint of pipe of reinforced thermosetting resin material for assembly into a string of pipe as may be used in a deep well, comprising: wrapping resin soaked reinforcing fibers around a mandrel in a desired pattern and in a continuous length sufficiently to form a pipe bore and wall thickness of predetermined dimensions; cutting from the continous length of pipe, a joint of predetermined length; applying thread moulds to the ends of the joint while the resin is sufficiently formable to allow for forming of desired internal threads within both ends of the joint; removing the moulds from the joint after the resin has hardened sufficiently to maintain form of the joint and threads.

2. A joint of pipe formed in accord with claim 1.

3. A high strength connection for joints of pipe formed of reinforced thermosetting resin material for assembly into a pipe string of any desired length as may be hung in a deep well, sufficient to resist chemical attack by fluid in contact with the string, comprising: the joints being formed within both ends with tapered internal threads; a coupling having tapered external threads formed at both ends for sealing cooperation with said internal threads; the coupling being formed of a material sufficient to resist chemical attack by the fluid; the coupling material having a more reliable compressive strength than the pipe material, sufficient to prevent cracking of the coupling wall by compressive makeup stresses.

4. The connection of claim 3, further comprising: the coupling material being formed of a homogeneous plastic material.

5. The connection of claim 3, further comprising: the coupling being formed of a metal that has suitable resistance to chemical attack by the fluid.

6. The connection of claim 3 futher comprising: a thread form having a load flank angle of at least 75 degrees with respect to the pipe axis.

7. The connection of claim 3 futher comprising: the taper of the external thread being formed with a smaller included angle than the taper of the internal thread.

8. The connection of claim 7 futher comprising: the threads being dimensioned such that at full make up, the circumferential compressive stress within the small diameter end of the external threads is at a first desired value and the circumferential tension stress within the end of the tubing joint wall is at a second desired value, less in magnitude than the first desired value.

9. The connection of claim 3, further comprising: the coupling being made of a sufficiently harder material than the joint, so as to increase wear life of the connection threads.

10. A high production process for forming pipe threads with the ends of a joint of pipe formed of reinforced thermosetting resin as by wrapping resin soaked fibers around a cylindrical mandrel to provide a partially hardened joint of pipe, comprising: applying thread molds to the ends of the joint already formed while the resin is sufficiently formable to allow for the forming of the desired threads with both ends of the joint.

* * * * *